(12) United States Patent
Jankovic

(10) Patent No.: US 7,503,166 B2
(45) Date of Patent: Mar. 17, 2009

(54) GASOLINE INTERNAL COMBUSTION ENGINE WITH DYNAMIC COMBUSTION MODE ALLOCATION

(75) Inventor: Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 11/282,132

(22) Filed: Nov. 18, 2005

(65) Prior Publication Data

US 2007/0113546 A1 May 24, 2007

(51) Int. Cl.
*F01N 3/00* (2006.01)
(52) U.S. Cl. .............................. 60/285; 60/274; 60/284; 60/292; 123/90.15; 123/300; 123/305; 123/443
(58) Field of Classification Search .................... 60/274, 60/284, 285, 287, 292, 324; 123/90.15, 295, 123/300, 305, 443
See application file for complete search history.

(56) References Cited

U.S. PATENT DOCUMENTS

| | | | |
|---|---|---|---|
| 5,036,668 A | 8/1991 | Hardy | |
| 5,974,793 A * | 11/1999 | Kinugasa et al. | ............... 60/285 |
| 6,267,097 B1 | 7/2001 | Urushihara et al. | |
| 6,276,334 B1 | 8/2001 | Flynn et al. | |
| 6,286,482 B1 * | 9/2001 | Flynn et al. | ................. 123/435 |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,390,054 B1 | 5/2002 | Yang | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 * | 5/2004 | Yamaoka et al. | .......... 123/90.15 |
| 6,772,585 B2 * | 8/2004 | Iihoshi et al. | .................. 60/277 |
| 6,923,167 B2 | 8/2005 | Flowers | |
| 6,932,175 B2 | 8/2005 | Teraji et al. | |
| 7,089,913 B2 * | 8/2006 | Yamaoka et al. | ....... 123/406.48 |
| 2004/0065279 A1 | 4/2004 | Hitomi et al. | |
| 2004/0182359 A1 | 9/2004 | Stewart et al. | |
| 2005/0121008 A1 | 6/2005 | Kilkenny et al. | |
| 2005/0173169 A1 | 8/2005 | Gray, Jr. | |

OTHER PUBLICATIONS

Lang et al., "Thermodynamical and Mechanical Approach Towards a Variable Valve Train for the Controlled Auto Ignition Combustion Process," SAE Technical Paper Series, Apr. 11-14, 2005, 2005-01-0762, SAE International, Warrendale, Pennsylvania.

* cited by examiner

*Primary Examiner*—Binh Q. Tran
(74) *Attorney, Agent, or Firm*—Allan J. Lippa; Alleman Hall McCoy Russell & Tuttle LLP (57) ABSTRACT

An internal combustion engine having combustion cylinders capable of running on gasoline in either a spark ignition mode or in a homogenous charge compression mode. The allocation of cylinders in each mode is dynamic and may be dynamically controlled and varied during operating of the engine. Also, the engine may include plural aftertreatment systems which may be dynamically selected, typically based on the combustion mode(s) in which the cylinders are operating.

20 Claims, 7 Drawing Sheets

GASOLINE INTERNAL COMBUSTION ENGINE WITH DYNAMIC COMBUSTION MODE ALLOCATION

BACKGROUND

Various types of combustion may be used in an internal combustion engine. For example, spark ignition (SI) of a homogenous mixture during the expansion stroke is one example method. This method relies on a timed spark from a sparking plug in order to achieve ignition within the combustion chamber of an air and fuel mixture. Another type of combustion may be referred to as homogeneous charge compression ignition (HCCI), which occurs when the temperature of the combustion chamber exceeds an autoignition temperature for the specific fuel resulting in autoignition. HCCI can be used to provide greater fuel efficiency and reduced NOx production under some conditions.

In some cases it may be desirable to enable the combustion cylinders of the engine to operate either in SI mode or in HCCI mode, and from time to time during operation, switch from one mode to the other, so as to obtain the benefits associated with the different combustion modes. The benefits obtained by mode switching may be somewhat offset, however, by temporary performance and/or efficiency losses occurring as a result of transitioning the combustion mode for all of the cylinders. The presence of SI and HCCI combustion modes also presents aftertreatment issues, due to the significant differences in HCCI and SI combustion.

Thus, in one approach, the above issues may be addressed by an internal combustion engine, comprising: (a) a gasoline fuel injection system; (b) multiple combustion cylinders coupled with the gasoline fuel injection system and configured to receive gasoline from the gasoline fuel injection system, where the combustion cylinders are each further configured to operate selectively in either a spark ignition mode or in a compression ignition mode in which spark ignition is not employed; and (c) an electronic engine controller configured to allocate the combustion cylinders into a first group which is operated in the spark ignition mode, and a second group which is operated in the compression ignition mode, and where such allocation is dynamic such that the number of cylinders operating in each ignition mode is variable and changeable over time during operation of the internal combustion engine. In this way, multiple combustion modes may be flexibly and dynamically deployed in order to obtain an improved mix of advantages of the available combustion modes while minimizing the disadvantages associated with fixed combustion mode allocations and full cylinder set mode transitions.

DETAILED DESCRIPTION

Figure 1:
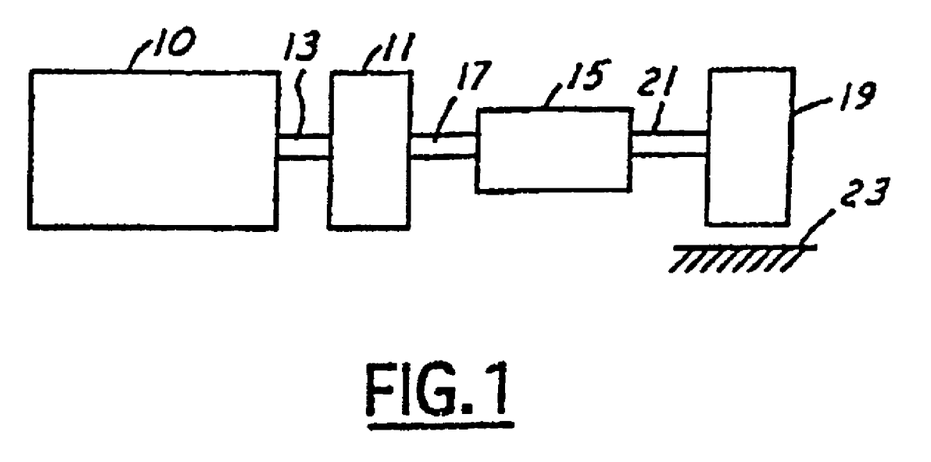
FIG. 1A is a block diagram of a vehicle illustrating various components of the powertrain system.
FIGS. 1B and 1C show a partial engine view.
Figure 1A:
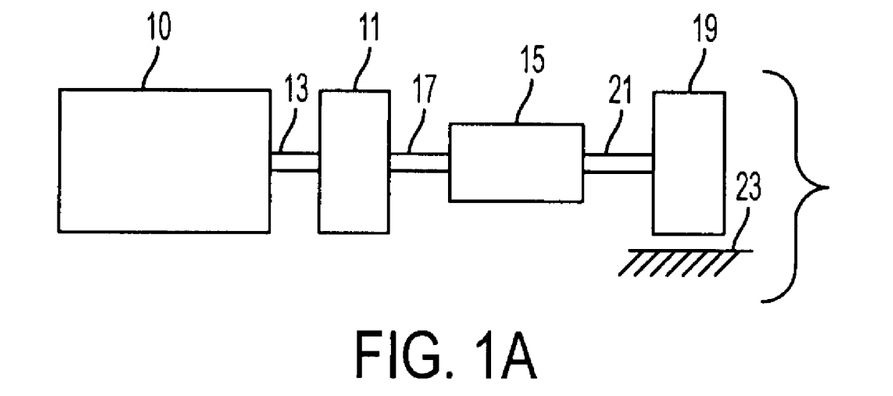
Figure 1B:
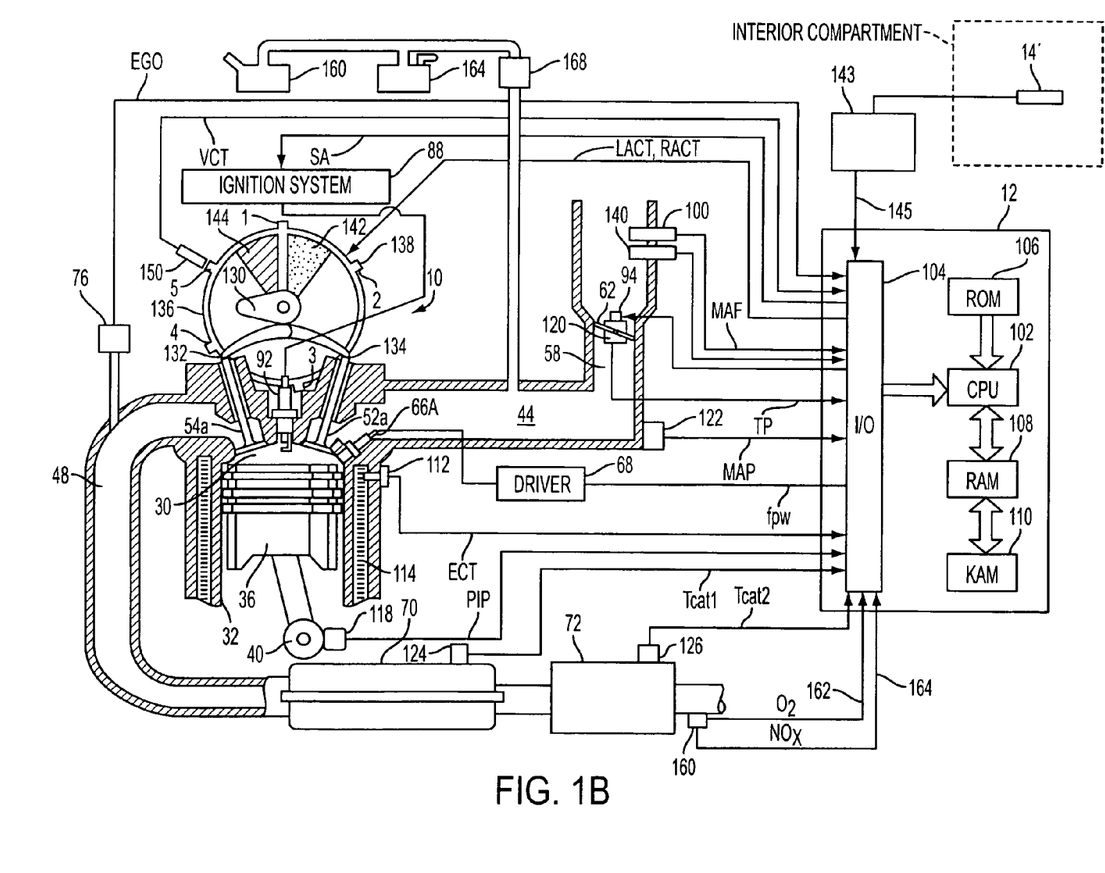
Figure 1C:
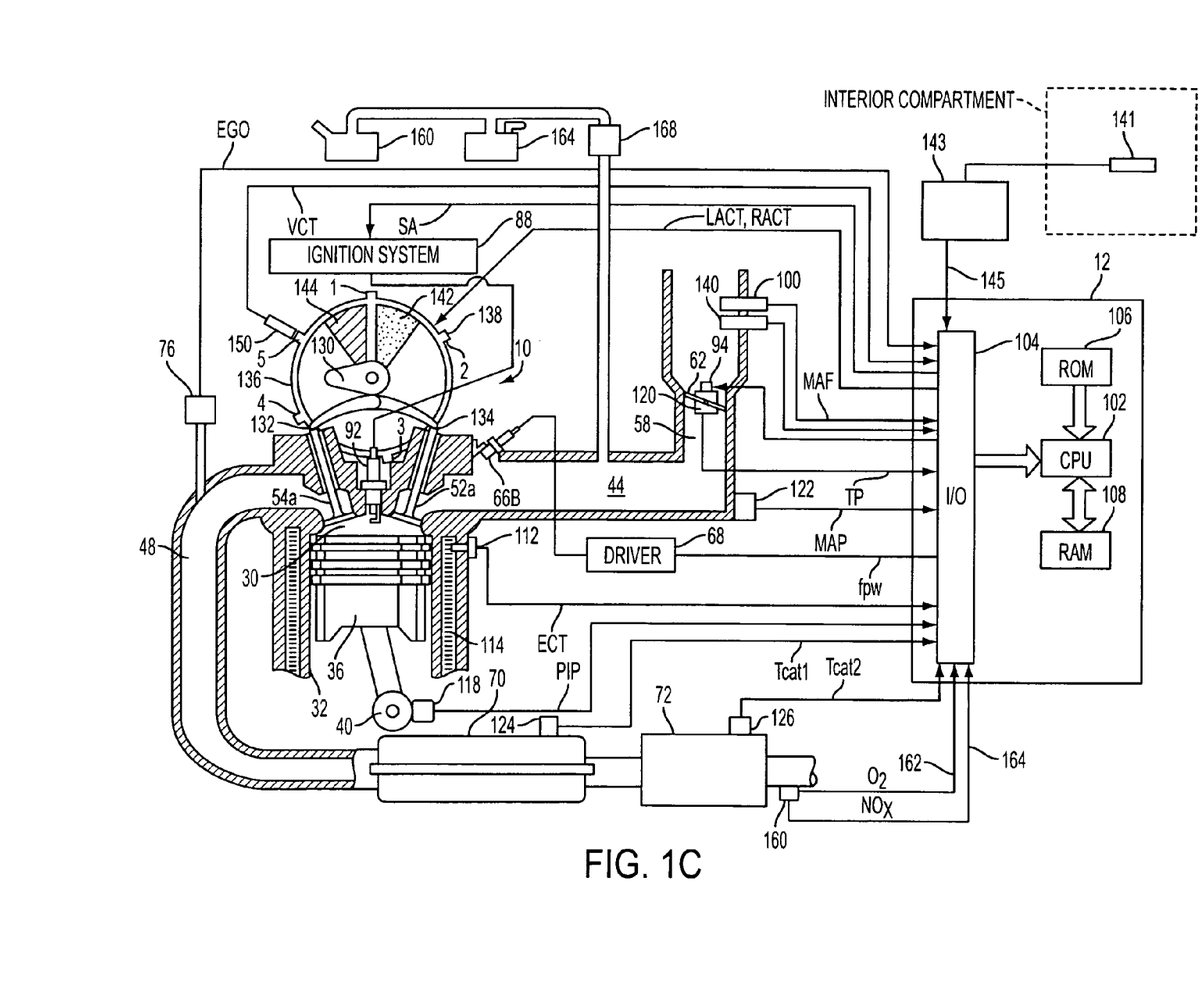

Referring to FIG. 1A, internal combustion engine 10, further described herein with particular reference to FIGS. 1B and 1C, are shown coupled to torque converter 11 via crankshaft 13. Torque converter 11 is also coupled to transmission 15 via turbine shaft 17. Torque converter 11 has a bypass, or lock-up clutch 14 which can be engaged, disengaged, or partially engaged. When the clutch is either disengaged or partially engaged, the torque converter is said to be in an unlocked state. The lock-up clutch 14 can be actuated electrically, hydraulically, or electro-hydraulically, for example. The lock-up clutch 14 receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

FIGS. 1B and 1C show one cylinder of a multi-cylinder engine, as well as the intake and exhaust path connected to that cylinder. Continuing with FIG. 1B, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Note that sensor 76 corresponds to various different sensors, depending on the exhaust configuration as described below with regard to FIG. 2. Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12. Though spark ignition components are shown, engine 10 (or a portion of the cylinders thereof) may be operated in a compression ignition mode, with or without spark assist, as explained in more detail below.

Controller 12 may be configured to cause combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous spark-ignition mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel ratio being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72. It will be understood that various different types and configurations of emission control devices and purging systems may be employed.

Controller 12 is shown in FIG. 1B as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1B, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1A, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of both oxygen concentration in the exhaust gas as well as NOx concentration. Signal 162 provides controller a voltage indicative of the $O_2$ concentration while signal 164 provides a voltage indicative of NOx concentration. Alternatively, sensor 160 can be a HEGO, UEGO, EGO, or other type of exhaust gas sensor. Also note that, as described above with regard to sensor 76, sensor 160 can correspond to various different sensors depending on the system configuration.

As described above, FIGS. 1B (and 1C) merely show one cylinder of a multi-cylinder engine, and that each cylinder has its own set of intake/exhaust valves, fuel injectors, spark plugs, etc.

Referring now to FIG. 1C, a port fuel injection configuration is shown where fuel injector 66B is coupled to intake manifold 44, rather than directly to cylinder 30.

It will be appreciated that the examples of FIGS. 1B and 1C are but two examples, and that many other engine configurations are possible. For example, instead of the cam mechanisms discussed above, intake and exhaust valves (e.g., intake valves 52a, 52b and exhaust valves 54a, 54b) may be actuated electromechanically or electrohydraulically. Indeed, as discussed in more detail below, it may be desirable to employ a variety of combustion modes, including spark ignition, homogeneous charge compression ignition (HCCI), and/or HCCI with a spark assist. Moreover, it may be desirable from time to time to switch the combustion modes for one or more combustion cylinders. Accordingly, it will be desirable in some cases to exercise variable control over valve operation, so as to obtain the desired performance in a given combustion mode. Valve control variation (e.g., variation in timing, lift, etc.) may be achieved through cam profile switching, variable cam timing, electromechanical valve actuation (EVA), etc., for both intake and exhaust valves of the combustion cylinders.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Humidity sensing may also be employed in connection with the depicted embodiments. For example, an absolute, or relative, humidity sensor 140 is shown for measuring humidity of the ambient air. This sensor can be located either in the inlet air stream entering manifold 44, or measuring ambient air flowing through the engine compartment of the vehicle. Further, in an alternative embodiment, a second humidity sensor (141) is shown which is located in the interior of the vehicle and coupled to a second controller 143 that communicates with controller 12 via line 145. The control processes described below herein can be located in controller 12, or controller 143, or a combination thereof. Further note that the interior humidity sensor can be used in a climate control system that controls the climate in the passenger compartment of the vehicle. Specifically, it can be used to control the air-conditioning system, and more specifically, whether to enable or disable the air-conditioning compressor clutch which couples the compressor to the engine to operate the compressor.

As will be described in more detail below, combustion in engine 10 can be of various types/modes, depending on operating conditions. In one example, spark ignition (SI) can be employed where the engine utilizes a sparking device, such as spark plug coupled in the combustion chamber, to regulate the timing of combustion of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine load and speed it may produce increased levels of NOx and lower fuel efficiency when compared with other types of combustion.

Another type of combustion that may be employed by engine 10 uses homogeneous charge compression ignition (HCCI), where autoignition of combustion chamber gases occurs at a predetermined point after the compression stroke of the combustion cycle, or near top dead center of compression. Typically when HCCI combustion is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Further, fuel efficiency while operating in a compression combustion mode may be increased by reducing the engine pumping loss, increasing the gas specific heat ratio, and by utilizing a higher compression ratio.

In compression ignition operation mode, it will often be desirable to exercise close control over the timing of autoignition. The initial intake charge temperature directly affects the timing of autoignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that autoignition is also a phenomena that may cause knock in a spark-ignited engine. Knock is undesirable in spark-ignited engines because it enhances heat transfer within the cylinder and may burn or damage the piston. In an HCCI engine, with its high air-to-fuel ratio, knock does not generally cause degradation of the engine because the diluted charge keeps the maximum temperature of the burned gases relatively low.

In comparison to a spark ignition engine, the temperature of the charge at the beginning of the compression stroke typically should be increased to reach auto-ignition conditions at or near the end of the compression stroke. It will be appreciated by those skilled in the art, in view of this disclosure, that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbocharging and supercharging), and heating the intake air charge (external EGR).

During HCCI combustion, autoignition of the combustion chamber gas is controlled to occur at or near a desired position of the piston to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

A third type of combustion that may be performed by engine 10 utilizes a sparking device to initiate (or assist) combustion when the temperature of the combustion chamber gas approaches an autoignition temperature (e.g., reaches a level substantially near autoignition without achieving combustion). Such a spark assist type of combustion can exhibit increased fuel efficiency and reduce NOx production over that of SI combustion, yet may operate in a higher load range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on spark timing to provide the final energy needed to attain autoignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate autoignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine load requirements, spark assist may be activated to ensure proper combustion timing. As the engine is returned to a low or moderate load requirement, the involvement of spark assist may cease in order to realize the full benefits of HCCI.

The ambient humidity of air drawn into the engine during the intake stroke directly affects peak combustion temperatures. As the ambient humidity of the air drawn into the engine during the intake stroke increases, the peak combustion temperature is decreased via dilution of the charge with material that cannot be oxidized and subsequently raises the required initial charge temperature to attain efficient HCCI combustion. The ambient or relative humidity can be determined using sensors 140 and/or 141 or may be inferred from other data and passed on to engine controller 12 to determine the ideal adjustments to engine control parameters for efficient operation. Note that a plurality of other parameters affects both the peak combustion temperature and the required peak temperature for efficient HCCI combustion. These and any other applicable parameters may be accounted for in the routines embedded in engine controller 12 and may be used to determine optimum operating conditions. For example, as the octane rating of the fuel increases, the required peak combustion temperature may increase as the fuel requires a higher peak combustion temperature to achieve ignition. Also, the level of charge dilution may be affected by a variety of factors including both humidity and the amount of exhaust gases present in the intake charge.

Due to the various benefits provide by the different combustion modes discussed above, it may be desirable to employ configurations in which cylinders are capable of changing to a different combustion mode. For example, under a certain set of operating conditions (e.g., engine speed/load, requested torque, desired fuel economy, etc.), it may be desirable to employ HCCI operation), while at other times, spark assist HCCI or normal spark ignition may be more advantageous. Accordingly, engine 10 may be configured so that its combustion cylinders can be operated in either spark mode or HCCI mode.

The ability to switch between combustion modes may present various issues. Assuming a combustion mode transition can be effected, a temporary performance penalty may result from the transition. For example, in certain conditions, it may take a few combustion cycles for a cylinder set to fully switch over to the new mode of combustion. During the transition, those cylinders may create additional emissions issues and/or operate at a lower efficiency level. Sometimes, for other reasons, the benefits of the new combustion mode may not be immediately realized. For example, switching from HCCI (lean A/F ratio) to SI (stoichiometric) may require temporary rich operation to reset the catalyst of the aftertreatment system.

Also, it will be appreciated that a transition from HCCI to SI mode may be desirable well before the catalyst temperature drops too low, in order to avoid a situation where the catalyst is not able to properly process the products of combustion. Catalyst temperatures may also need to be maintained for HCCI operation, to process hydrocarbon and carbon monoxide emissions that may arise during HCCI combustion.

At other times, conditions are such that a mode transition cannot be performed. For example, SI and HCCI cylinders may run at very different exhaust temperatures. During periods of prolonged HCCI operation, exhaust temperatures may not be high enough to maintain the catalyst at a high enough temperature to process SI emissions. Thus a transition to SI would have to be delayed (and the benefits of the transition would thus be delayed) until the catalyst was prepared for the transition (e.g., heated to an appropriate "light-off" temperature). Furthermore, these transition-related issues are often magnified by the fact that all of the combustion cylinders are transitioned to the other mode.

One way of addressing these issues is to create cylinder partitions, or groupings, in which a first partition/grouping of cylinders operates in one combustion mode (e.g., spark ignition), while another partition/grouping operates in another mode such as HCCI. Note that a group or partition may have only a single cylinder, or a plurality of cylinders, depending on conditions.

For example, in a V-8 engine configuration, a first bank of four cylinders could be dedicated to HCCI operation, with the remaining bank running in spark ignition mode. Such a configuration, however, may be limited in flexibility and not appropriate for all operating conditions. The strengths and shortcomings of such a configuration flow from the properties inherent to each combustion mode: the spark mode bank would operate with a markedly lower fuel efficiency, but with greater torque range/capacity, while the HCCI bank would provide higher fuel efficiency, but over a limited range of engine speed/load. The permanent allocation of four cylinders to each mode may, in some cases, limit the ability to optimize the blend of advantages available from each mode of operation.

Accordingly, various embodiments may be configured to enable flexible allocations of combustion modes among the cylinders, such that, at different times, a different number of cylinders would be operating in each combustion mode. In these configurations, some or all of the combustion cylinders are configured to be operated in multiple combustion modes (e.g., in spark ignition and HCCI mode; in spark ignition, HCCI and spark assist modes; etc.).

Note that the example control and estimation routines included herein can be used with various engine and/or hybrid powertrain configurations. The specific routines described herein may represent one or more of any number of processing strategies such as event-driven, interrupt-driven, multitasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 2:
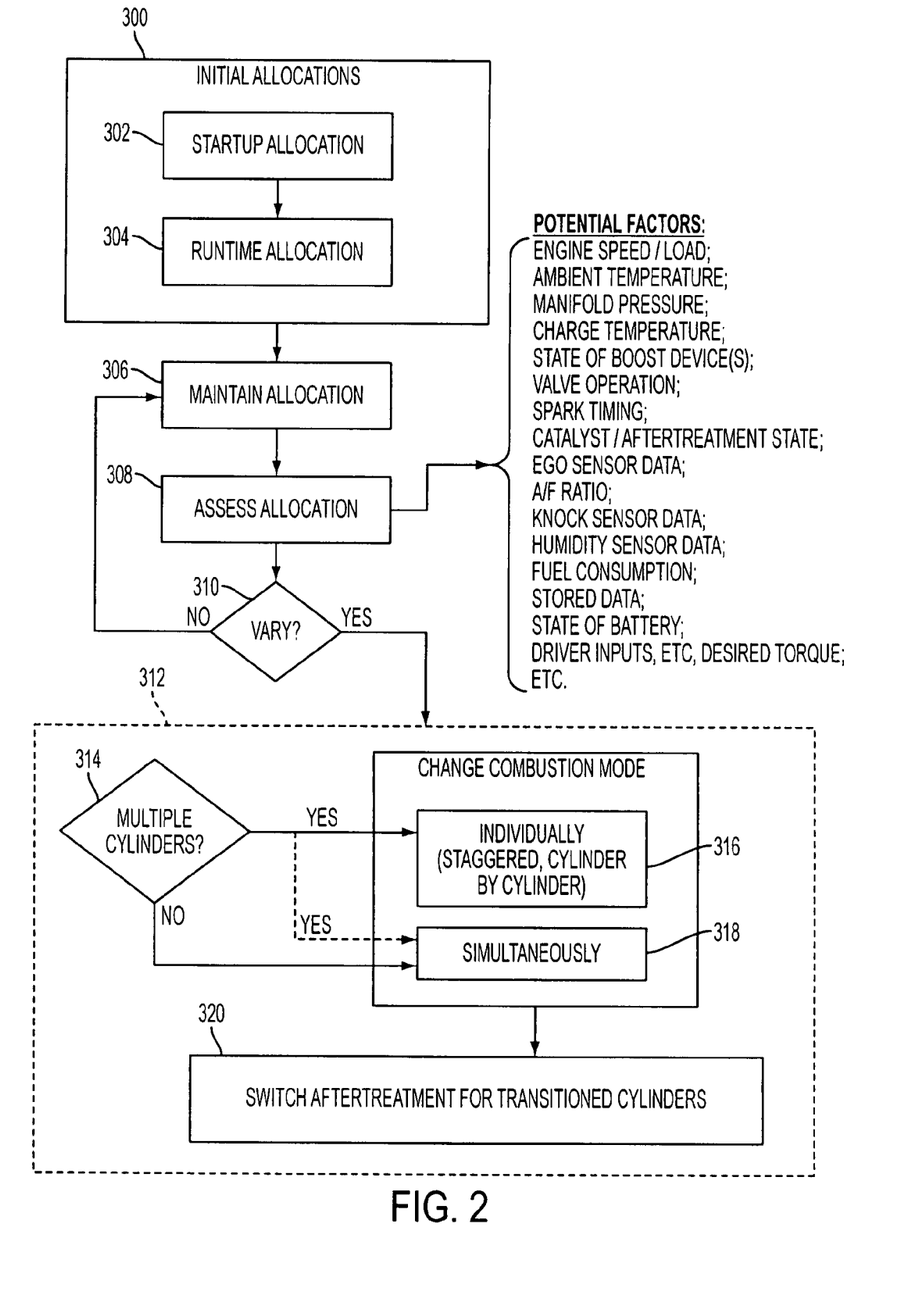
FIG. 2 is a flowchart depicting an exemplary method of operating an internal combustion engine in which cylinder combustion modes are dynamically allocated among multiple combustion modes and in which aftertreatment methods may be dynamically varied for the combustion cylinders.

FIG. 2 depicts an exemplary method of operating an internal combustion having cylinders that may be flexibly allocated into different combustion modes of operation. At 300, the method includes establishing an initial allocation 302 of combustion modes. This may include, for example, setting all cylinders to operate initially in spark ignition mode, since HCCI operation typically may be postponed until elevated charge temperatures can be obtained. Thus, at cold start for a V-8 engine, all eight cylinders could be allocated to operate in spark ignition mode. Alternatively, variable displacement methodologies could be employed, such that only a portion of the cylinders would be operated at startup and during idle, with the remaining cylinders being placed into a deactivated mode.

After startup, an initial run-time allocation may be employed, as shown at 304. The run-time allocation may be preconfigured at design time, may be established based on adaptation to driver behavior, set during aftermarket modification, etc. In any case, the initial run-time allocation might involve half the cylinders running in HCCI mode, with the other half operating in spark ignition mode. Alternatively, an unequal allocation could be employed, or all of the cylinders could be placed into the same combustion mode.

It will be appreciated that certain conditions and/or engine operating parameters correspond to each combustion mode. In HCCI, for example, charge temperatures should be controlled so that combustion is initiated at the desired time. Typically, this involves a higher charge temperature than is used in SI operation. Heat exchangers, changes to valve operation, boosting, etc. may be employed to obtain the elevated charge temperature. Indeed, valve timing and lift typically will vary between cylinders operating in SI mode and cylinders operating in HCCI mode. Also, different A/F ratios may be employed, and aftertreatment systems/methods may be different. These are but a few examples, and as is appreciated in the art, many operating conditions/parameters may vary between the different combustion modes.

At 306, the method includes maintaining the established allocation, while at 308, an assessment of the current mode allocation is performed. Assessment 308 may include any factor or combination of factors that is pertinent to operation of the engine. These factors may include engine speed; engine load; ambient temperature; charge temperature; exhaust temperature; current valve operation; state of battery (in HEV-enabled configurations); state/temperature of catalyst; state of boost device(s), if any; data from EGO sensors, humidity sensor, knock sensor, and/or any other sensors; A/F ratio; fuel consumption/efficiency; driver inputs such as requested torque; spark timing, combinations thereof; etc.

Assessment 308 is performed in order to determine whether the current allocation is providing the desired level of performance and a desired blend of the advantages that are provided by the available combustion modes. The assessment may indicate that a change to the allocation is needed, as show at 310. Such a change may involve transitioning the combustion mode for one or more cylinders to a different mode, as shown at 312. This may include changing the number of cylinders in a specific mode, or simply changing which cylinders operate in which mode, or combinations thereof. For example, in regards to the V-8 dual bank example, the routine may transition from 8 cylinders in SI mode to one bank in HCCI and one bank in SI, or may change from a configuration with a left bank in SI mode and a right bank in HCCI mode to the left bank in HCCI mode and the right bank in SI mode.

A change in the number of cylinders operating in the different modes may be performed in response to any user input or operating parameter. For example, if increased torque is needed, the number of SI cylinders may be increased. The number of cylinders operating in each mode may be varied to vary charge temperature for the cylinders in HCCI mode. Mode allocations may be varied in response to changes in:

engine speed/load; state of aftertreatment systems, such as catalyst temperature; state of battery in HEV systems; etc.

The assessment may also include determining whether a potential reallocation may somehow be postponed or avoided. For example, if the driver has requested more torque than can be efficiently provided by the existing allocation over a sustained period, a determination may be made as to whether an alternate torque source, such as a battery in HEV-enabled systems, may be employed. Temporary use of the battery could be employed in such a situation to delay the reallocation of cylinders. Alternatively, if the elevated torque request was relatively short in duration, the torque supplied from the battery might be sufficient to avoid the reallocation altogether. If a re-allocation is not needed, or if it can be delayed or avoided, the current allocation is maintained at 306, and further assessment is performed at 308 as operation continues.

If a reallocation is in order, various actions may be performed to provide smooth combustion mode transitions, so as to reduce performance penalties, and/or avoid torque discontinuities, NVH and other undesirable effects. For example, as shown at 314, if the reallocation involves multiple cylinders, the cylinders can be switched one at a time, in a staggered manner, as shown at 316, in order to minimize the transition issues. Alternatively, all of the cylinders may be switched at the same time, as shown at 318, if desired. In any case, additional actions may be performed in connection with smoothing combustion mode transitions. For example, subsequent or prior to the combustion mode change at 316 and 318, torque holes or surpluses, may be avoided through use of boosting devices, batteries or other energy storage devices, or through other torque sources and/or torque absorbers, or combinations thereof. For example, if a certain transition is known to produce an immediate torque surge, various compensatory methods may be employed, such as charge dilution, spark timing variations, absorbing the torque with a battery, energy storage device, or other torque absorbing devices, etc. These methods may be employed at any appropriate time relative to the torque surge, in order to provide the desired smoothing. Similarly, for transitions that produce a temporary torque deficit, compensation may be obtained via an alternate torque source, such as a battery, via boosting, via generating additional torque with the non-transitioning cylinders, etc. As in the other example, the compensation may be performed at various times relative to the actual drop in torque.

In some embodiments, multiple aftertreatment systems may be provided, and the system may then be configured so that the multiple-mode cylinders can be selectively coupled to the different aftertreatment systems (or coupled to multiple aftertreatment systems). For example, HCCI operation typically is more lean in comparison to SI combustion, such that the combustion afterproducts can vary substantially. Specifically, HCCI operates very lean, while SI operation produces much higher levels of NOx, which are not reduced by the catalyst if the overall mixture is lean. Also, HCCI exhaust typically is lower in temperature than SI exhaust. For example, under some conditions, HCCI exhaust temperatures can be lower than that which is optimal for maintaining a desired operating state of the types of catalysts used in SI aftertreatment. Accordingly, it can be desirable in certain embodiments to have separate aftertreatment systems.

Figure 3:
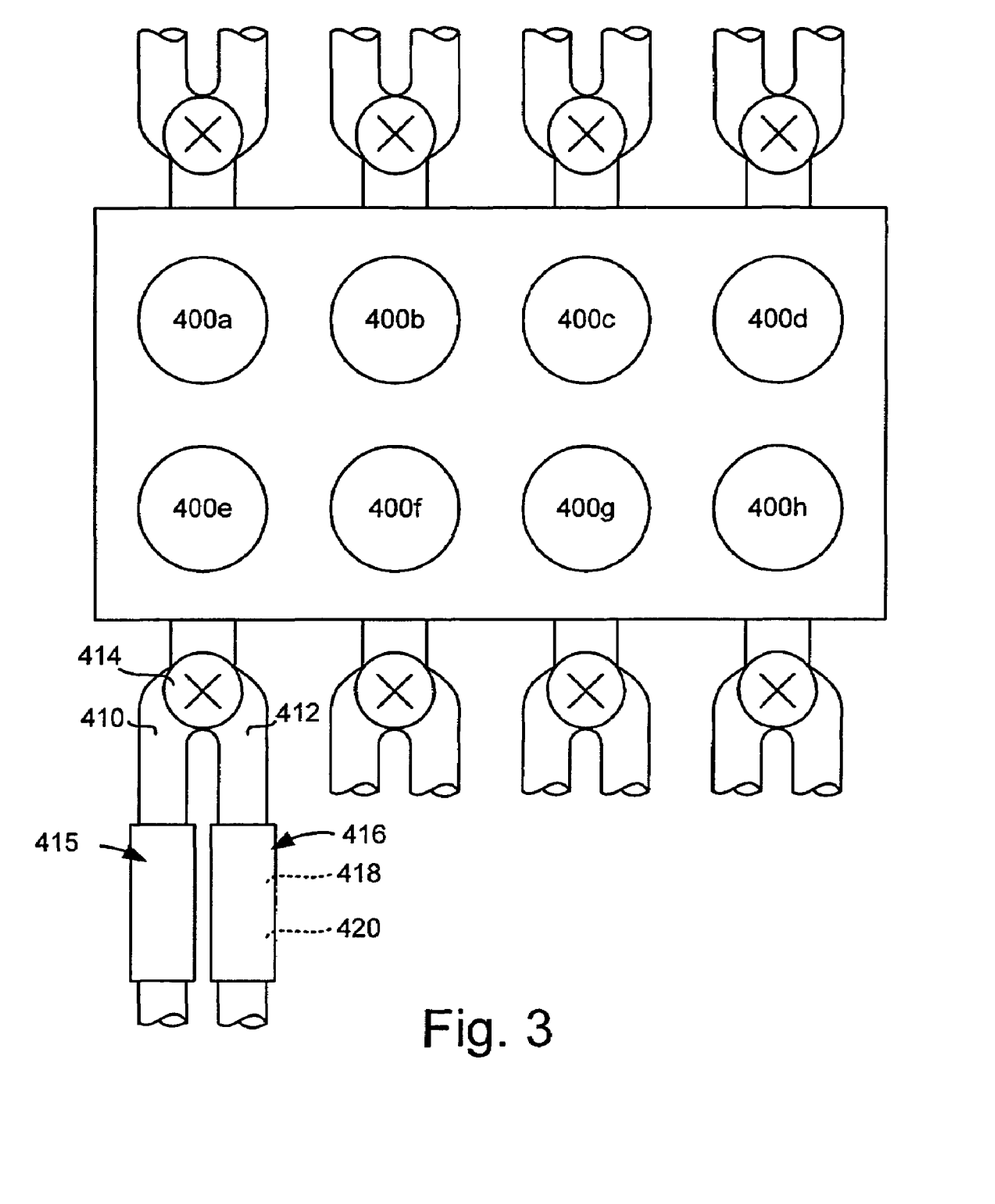
FIG. 3 schematically depicts an exemplary configuration of a portion of an engine in which dynamic combustion mode allocation may be employed, along with selective coupling of combustion cylinders to different aftertreatment systems.

An example of such a system is shown in FIG. 3. The figure schematically shows the combustion cylinders of an engine with a V-8 configuration. It should be appreciated, however, that the present discussion is applicable to a wide variety of engine configurations in which combustion cylinders are transitioned between different combustion modes.

As shown in the figure, each combustion cylinder 400 may be fluidly coupled with two exhaust manifolds 410 and 412 (reference numbers shown on one cylinder only). Manifold 410 may correspond, for example, to HCCI operation, with manifold 412 being used during SI operation. Each cylinder may also be provided with an exhaust manifold switching mechanism 414, or the like, which is configured to direct the cylinder exhaust to the desired manifold.

Figure 4:
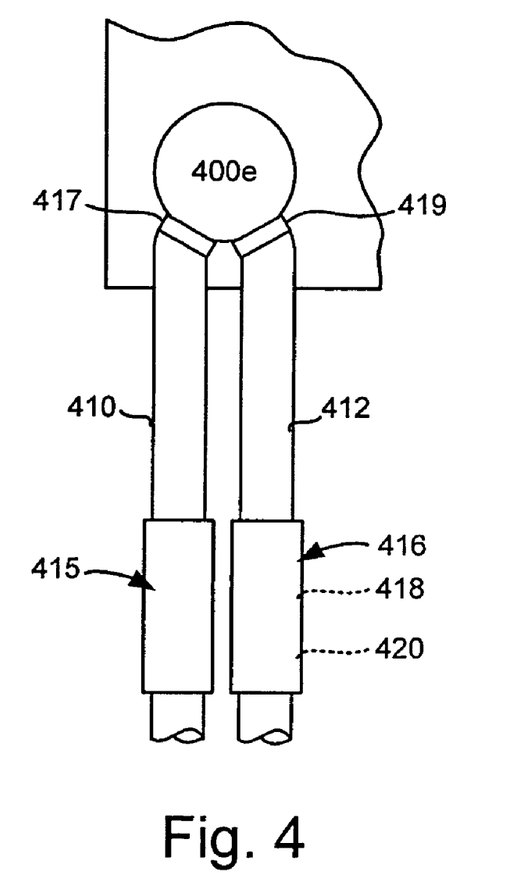
FIG. 4 is a partial view of the embodiment of FIG. 3, showing an exhaust switching mechanism implemented in the form of exhaust valves coupled to separate exhaust manifolds and aftertreatment systems.

Switching mechanism 414 may take a variety of forms. The mechanism may incorporate various structural features and/or operation of conventional exhaust valves, and/or may take additional forms. Each manifold may be provided with a separate valve whose operation is controlled via valve deactivation, cam profile switching, EVA actuation, and/or other methods/structures. FIG. 4 is a partial view of the embodiment of FIG. 3, showing that switching mechanism may be implemented in the form of separate exhaust valves 417 and 419 for each of the two manifolds. Typically, all of the exhaust gases are directed into one manifold or the other, though it may be desirable in some cases to employ partial valve states in which a portion of the exhaust is directed into each manifold.

As shown in FIGS. 3 and 4, each of the provided manifolds (in the present example, HCCI manifold 410 and SI manifold 412) may be coupled with an aftertreatment system appropriate to that type of combustion. Aftertreatment system 416 for SI manifold 412, for example, may include a three way catalyst 418 and/or a lean NOx trap 420. The HCCI manifold typically also will be provided with an aftertreatment system 415 appropriate to the cooler, leaner HCCI combustion. Typically the aftertreatment systems are connected in parallel to one another and are external to each other, such that a given volume of exhaust travels through one aftertreatment system or the other upon leaving the combustion cylinders, absent internal EGR or some other drawing of the exhaust back into the combustion cylinders.

It should be appreciated that many different configurations are possible. One alternative is to have two separate manifolds (e.g., HCCI manifold 410 and SI manifold 412) that are common to all the cylinders, such that there are only two separate aftertreatment systems: one coupled to the HCCI manifold and one coupled to the SI manifold. Alternatively, in an engine with two banks of cylinders (e.g., a V8 with four cylinders in each bank), each bank may have an aftertreatment device for SI and a separate aftertreatment device for HCCI (thus totaling four aftertreatment devices for the engine), with the aftertreatment devices being coupled to the cylinders by appropriate exhaust manifolds. Specifically, in this example, one of the banks would have an SI manifold common to all of the cylinders in the bank and coupled to the SI aftertreatment system, and an HCCI manifold common to all the cylinders in the bank and coupled to the HCCI aftertreatment system. Each valve would include a switching mechanism as discussed above to couple it with the aftertreatement system appropriate to its current combustion mode.

Figure 5:
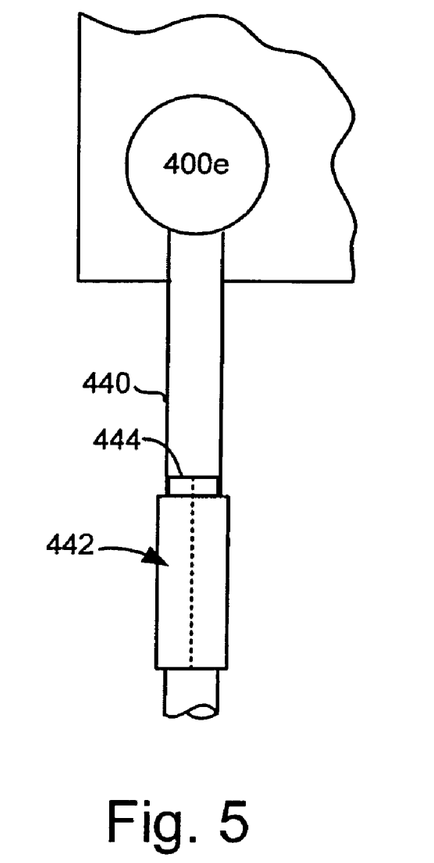
FIG. 5 shows a partial view similar to that of FIG. 4, but showing a bifurcated catalyst employed in connection with a single exhaust manifold.

In addition to or instead of the above configurations, a single manifold may be employed with a bifurcated catalyst, as shown in FIG. 5. In the figure, combustion cylinder 400e is coupled with manifold 440. Exhaust gases flowing through the manifold are separated upstream of bifurcated catalyst 442 (e.g., via operation of valve or valves 444) such that the exhaust gas flows are separated prior to and through the catalyst, thereby enabling selective aftertreatment implementation corresponding to different combustion modes employed within combustion cylinder 400*e*.

In certain configurations/embodiments, the presence of multiple modes of combustion may be employed to further advantage. The higher exhaust temperatures present in the SI manifold 412, for example, may be employed to facilitate initiation of HCCI combustion which, as discussed above, typically requires an elevated charge temperature to initiate. Furthermore, to the extent that it is desirable to employ temperature-dependent devices in the HCCI aftertreatment system 415 (e.g., devices requiring a minimum temperature to function), the system may be positioned in proximity to the SI exhaust manifold so that it can draw the necessary heat from the SI manifold.

Thus, continuing with the method of FIG. 2, when reallocation is effected, the exhaust system for a transitioned cylinder typically is also changed, as shown at 320. For example, if a cylinder is switched from SI to HCCI operation, the exhaust for that cylinder may be redirected from the SI to the HCCI exhaust manifold. The exhaust switching typically happens close in time to the change in combustion mode for the cylinder, though it may happen at other times, and may happen before, after or simultaneously with the transition in combustion modes. For example, intake valve timing may be transitioned after a final intake stroke in a first mode (e.g., SI) and before a first intake stroke in a second mode (e.g., HCCI) in order to control charge temperature to a desired value. However, exhaust valves may be transitioned after the final combustion stroke in the first mode, but before the combustion stroke in the second mode.

It should be appreciated that the dynamic allocation systems and methods discussed herein may provide many advantages, depending on the particular embodiments that are employed. A typical advantage that is obtained is the flexible blending of benefits of the different available combustion modes. A fixed allocation or partition of cylinders is not required, such that varying numbers of combustion cylinders can be operated in the desired modes at any given time, in order to optimize performance, efficiency, etc. In a dynamic allocation system with SI and HCCI modes, there typically is not a need to reset catalysts in connection with mode transitions, because the SI manifold and aftertreatment system typically is supplied with stoichiometric feedgas most, if not all of the time. Mode transitions are less abrupt and easier to negotiate due to the fact that the flexible partitioning system allows cylinders to be switched over one at a time, rather than all at once.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An internal combustion engine, comprising:
   a gasoline fuel injection system;
   multiple combustion cylinders coupled with the gasoline fuel injection system and configured to receive gasoline from the gasoline fuel injection system, where the combustion cylinders are each further configured to operate selectively in one of a spark ignition mode and a compression ignition mode in which spark ignition is not employed;
   an electronic engine controller configured to allocate the combustion cylinders into a first group which is operated in the spark ignition mode, and a second group which is operated in the compression ignition mode, and where such allocation is dynamic such that the number of cylinders operating in each ignition mode is variable and changeable over time during operation of the internal combustion engine, and such that the internal combustion engine includes a plurality of engine operation modes at steady state, including at least an all spark mode where all cylinders are operating in the spark ignition mode, an all compression mode where all cylinders are operating in the compression ignition mode, and a mixed spark and compression mode where some of the cylinders are operating in the spark ignition mode and some of the cylinders are operating in the compression ignition mode; and
   a spark ignition aftertreatment system and a separate compression ignition aftertreatment system.

2. The engine of claim 1, where the spark ignition aftertreatment system includes a spark ignition exhaust manifold, and where the compression ignition aftertreatment system includes a compression ignition exhaust manifold.

3. The engine of claim 1, where the spark ignition aftertreatment system is thermally coupled with an aftertreatment device which is external to the spark ignition aftertreatment system so as to enable heat transfer from the spark ignition aftertreatment system to such external device.

4. The engine of claim 1, where the combustion cylinders are further configured to operate in a spark assist HCCI mode having an air-fuel ratio which is substantially higher than that employed in the spark ignition mode.

5. The engine of claim 1, where the engine is configured to use heat generated by cylinders operating in the spark ignition mode to facilitate compression ignition for cylinders operating in the compression ignition mode.

6. The engine of claim 1, where each combustion cylinder includes an exhaust valve mechanism, and where the state of each exhaust valve mechanism is dependent upon the combustion mode in which an associated combustion cylinder is operating.

7. An internal combustion engine, comprising:
   a gasoline fuel injection system;
   a plurality of combustion cylinders, each being configured to receive gasoline injections from the gasoline fuel injection system and combust a mixture of air and gasoline in one of a spark ignition mode and a sparkless homogeneous charge compression ignition (HCCI) mode;
   an exhaust valve mechanism associated with each of the combustion cylinders, where each exhaust valve mechanism is operable in one of two modes, dependent upon whether the associated combustion cylinder is being operated in the spark ignition mode or the sparkless HCCI mode, and the internal combustion engine is configured to operate in a dual combustion mode with at least one combustion cylinder operating in the spark ignition mode and with at least one combustion cylinder operating in the sparkless HCCI modes;

where the engine is configured to dynamically vary the number of cylinders operating in each mode based on a state of an energy storage device configured to deliver torque in addition to or instead of that supplied by the engine.

8. The engine of claim 7, where the combustion cylinders are dynamically allocated between the spark ignition mode and the sparkless HCCI mode, such that the number of cylinders operating in each mode is variable and changeable over time during operation of the internal combustion engine.

9. The engine of claim 8, where the engine is configured to dynamically increase a number of cylinders operating in the spark ignition mode upon an increase in engine load.

10. The engine of claim 8, where the engine is configured to dynamically vary the number of cylinders operating in each mode based on a thermal state of an aftertreatment device of the engine.

11. The engine of claim 10, where the engine is configured to increase the number of cylinders operating in the spark ignition mode in response to a decrease in the temperature of the aftertreatment device.

12. The engine of claim 8, where the engine is configured to dynamically vary the number of cylinders operating in each mode based on a thermal state of air being supplied to one of the combustion cylinders.

13. The engine of claim 12, where the engine is configured to increase the number of cylinders operating in the spark ignition mode in response to a decrease in the temperature of the air being supplied to one of the combustion cylinders.

14. The engine of claim 7, including an electronic engine controller configured to control how many of the combustion cylinders are operated in the spark ignition mode and how many of the combustion cylinders are operated in the sparkless HCCI mode.

15. A method of operating an internal combustion engine, comprising:
delivering gasoline fuel injections from a gasoline fuel injection system to a plurality of combustion cylinders;
switching combustion modes for at least one of the combustion cylinders between a spark ignition mode and a sparkless homogeneous charge compression ignition (HCCI) mode; and
selectively redirecting exhaust from one or more of the plurality of combustion cylinders from a first aftertreatment system to a second aftertreatment system that is separate from the first aftertreatment system;
where one of the first aftertreatment system and the second aftertreatment system is configured to process exhaust from combustion cylinders operating in the spark ignition mode, and where the other one of the first aftertreatment system and the second aftertreatment system is configured to process exhaust from combustion cylinders operating in the sparkless HCCI mode.

16. A method of operating an internal combustion engine, comprising:
operating the internal combustion engine in a first state, in which some combustion cylinders of the internal combustion engine are fueled with gasoline and operated in a spark ignition mode, with the remaining combustion cylinders being fueled by gasoline and operated in a sparkless compression ignition mode;
after operating the internal combustion engine in the first state, operating the internal combustion engine in a second state, in which the ignition mode for at least one of the combustion cylinders is switched to an ignition mode that is different than that employed in the first state; and
for the at least one of the combustion cylinders, varying aftertreatment employed for the at least one of the combustion cylinders upon changing from the first state to the second state;
where one of the first state and the second state of the aftertreatment employed is configured to process exhaust from combustion cylinders operating in the spark ignition mode, and where the other one of the first state and the second state of the aftertreatment employed is configured to process exhaust from combustion cylinders operating in the sparkless compression ignition mode.

17. The method of claim 16, where varying the aftertreatment includes rerouting exhaust gas for the at least one of the combustion cylinders from a first exhaust manifold to a second exhaust manifold.

18. The method of claim 16, where varying aftertreatment for the at least one of the combustion cylinders includes selecting an aftertreatment system corresponding to the combustion mode that at least one of the combustion cylinders is being switched to.

19. The method of claim 16, further comprising operating the internal combustion engine in a third state after operating the internal combustion engine in the first and second states, where, in the third state, the number of combustion cylinders operating in the spark ignition mode differs from that in the first state and in the second state.

20. An internal combustion engine, comprising:
a plurality of combustion cylinders each being configured to receive a mixture of air and gasoline and ignite such mixture in one of a spark ignition mode and a homogeneous charge compression ignition mode;
a first aftertreatment system coupled with the combustion cylinders;
a second aftertreatment system coupled with the combustion cylinders in parallel, relative to the first aftertreatment system; and
an exhaust switching mechanism coupled between the combustion cylinders and the first and second aftertreatment systems and controllable to be in one of a first state and a second state;
where varying the state of the exhaust switching mechanism between the first and second states varies how much exhaust flows into each of the first and second aftertreatment systems;
where one of the first aftertreatment system and the second aftertreatment system is configured to process exhaust from combustion cylinders operating in the spark ignition mode, and where the other one of the first aftertreatment system and the second aftertreatment system employed is configured to process exhaust from combustion cylinders operating in the sparkless HCCI mode.

* * * * *